Aug. 3, 1965  H. W. ARCHER ETAL  3,198,907
ELECTRICALLY OPERATED CIRCUIT BREAKER
Filed Nov. 14, 1960  2 Sheets-Sheet 1
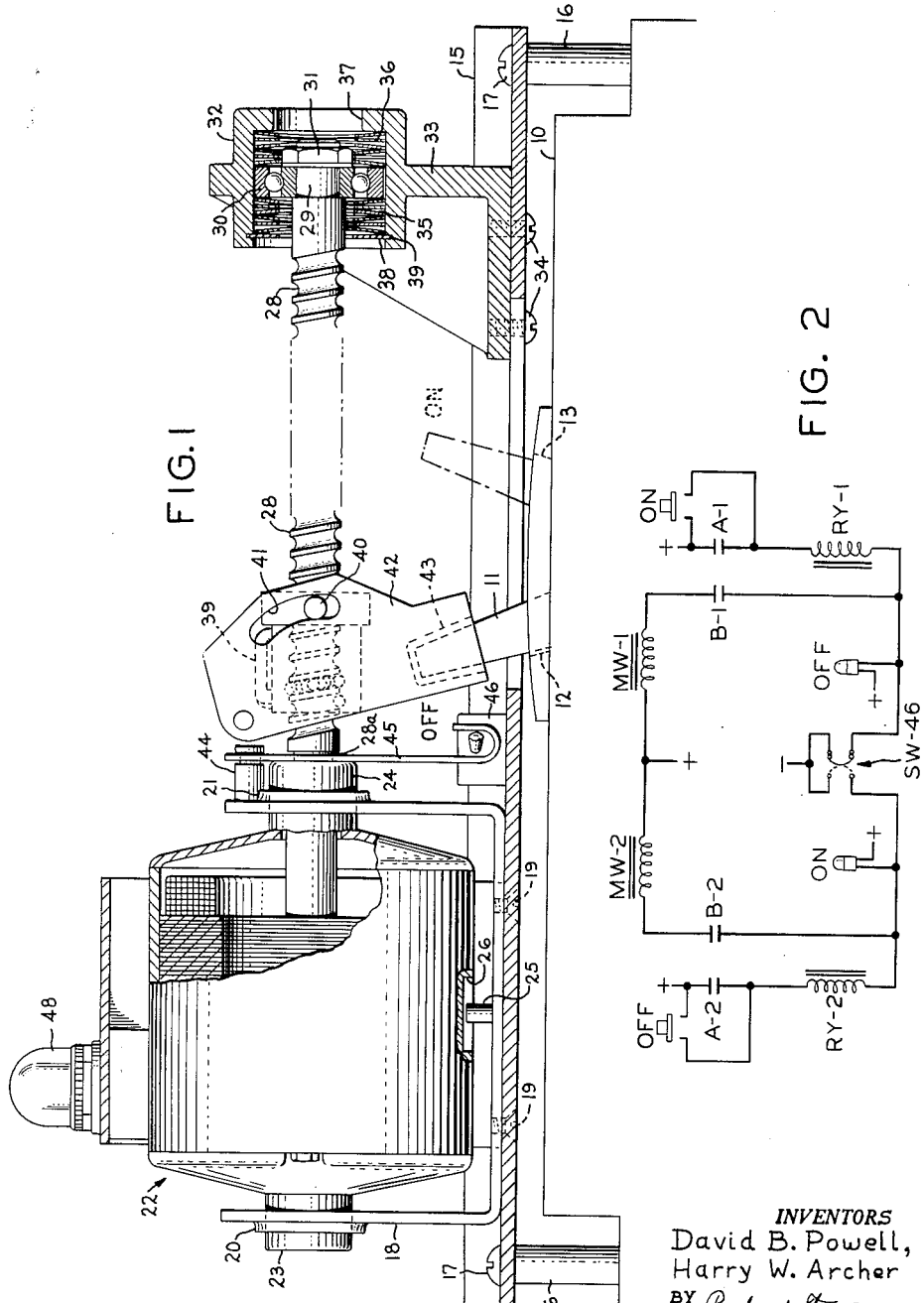
INVENTORS
David B. Powell,
Harry W. Archer
BY Robert J. Casey
ATTORNEY

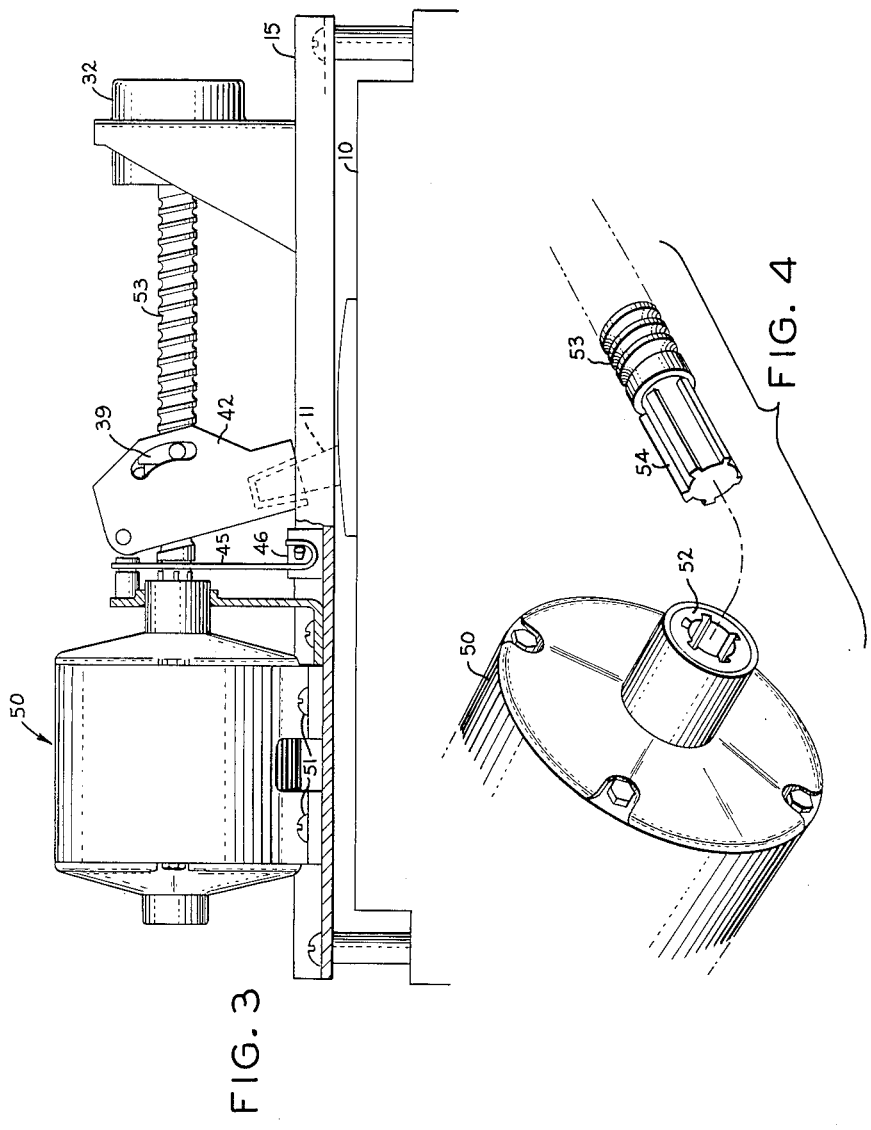

United States Patent Office 3,198,907
Patented Aug. 3, 1965

3,198,907
ELECTRICALLY OPERATED CIRCUIT BREAKER
Harry W. Archer, New Britain, and David B. Powell, Bristol, Conn., assignors to General Electric Company, a corporation of New York
Filed Nov. 14, 1960, Ser. No. 68,716
2 Claims. (Cl. 200—92)

Our invention relates to electrically operated circuit breakers and particularly to those of the type including a basic device comprising a molded case electric circuit breaker having a manually operable handle, combined with motor-operated means carried by the molded case for permitting electric power operation of the handle.

In accordance with the prior art, electrically-operated circuit breakers have been provided including an electric motor mounted on the insulating casing of the circuit breaker. The motor includes an extended armature shaft, carrying a travelling nut having an operating engagement with the circuit breaker handle. The armature and the shaft extension are made movable a small amount as a unit longitudinally of the shaft, and means is provided resiliently retaining the armature and shaft in a particular normal longitudinal position. Upon rotation of the shaft by the motor, the travelling nut is moved along the shaft, moving the operating handle from one extreme position to the other. When the operating handle encounters its limit of movement in a given direction, it prevents further movement of the travelling nut. When this happens, continued rotation of the operating shaft causes the operating shaft to thread itself through the travelling nut, in the opposite direction. This movement is utilized in accordance with the prior art to (1) absorb inertia energy of the rotating parts, thereby permitting resilient overtravel of the shaft beyond the point at which the motor is disconnected, and (2) to operate a limit switch to disconnect the motor and to condition the device for reverse operation. A construction of this type is disclosed and claimed in copending application Serial No. 68,728 filed November 14, 1960 by J. Staak and assigned to the same assignee as the present invention.

In accordance with such prior designs, it was necessary to construct a special motor having its armature movable axially with respect to the field winding, such electric motor not being readily usable as such for other applications.

Also, in such prior design, since the operating handle of the circuit breaker moves in along an arcuate path, whereas the travelling nut moves in a straight line, a force was exerted on the travelling nut, tending to rock the travelling nut lengthwise of the axis of rotation of the operating shaft, causing occasional binding, and detracting from the dependability of the assembly.

It is an object of the present invention to provide an electrically operated circuit breaker of the type including a basic molded case circuit breaker having a manually operable handle, and electric motor driven means for operating said handle and including means for resiliently absorbing inertia energy of the rotating parts so as to prevent breakage of such handle, while utilizing a conventional electric motor.

It is another object of the invention to provide an electric motor driven circuit breaker including a rotating shaft having a travelling nut in engagement with an arcuate-moving operating handle wherein no rocking stresses are exerted on the travelling nut while moving the handle along its arcuate path.

In accordance with the invention in one form, there is provided an electric motor driven circuit breaker comprising a basic circuit breaker having a casing of insulating material and including operating mechanism and a handle of molded insulating material projecting from the top wall for operating the mechanism. Electric operating apparatus is mounted on the top surface of the circuit breaker casing and includes a conventional electric motor connected to drive an operating shaft. The operating shaft is threaded and carries a travelling nut which has engagement with the manual operating handle of the circuit breaker. The operating shaft is also mounted for longitudinal displacement against resilient biasing means without requiring the motor armature to move relative to the motor housing.

In accordance with the invention in one embodiment, the operating shaft has a non-rotatable but axially slidable connection to the motor output shaft. In accordance with the invention in another embodiment, the entire motor and operating shaft are slidably mounted so that resilient displacement takes place of the entire assembly following motion of the operating handle to its extreme position.

In accordance with another aspect of the invention, an electric power driven circuit breaker is provided including a basic molded case circuit breaker having an insulating handle and a motor driven shaft carrying a travelling nut having a connection with the operating handle. The connection is provided by means of a pin-and-cam engagement, such that at all positions of the operating handle, the line of force exerted by the travelling nut on the handle, is parallel to the axis of rotation of the operating shaft, thereby having no tendency to cause binding of the travelling nut on the shaft.

The invention will be more fully understood from the following detailed description, and its scope will be pointed out in the appended claims.

In the drawings,

FIGURE 1 is a side elevation view, partially in section, of an electric motor driven circuit breaker embodying the invention, a portion of the basic circuit breaker being omitted;

FIGURE 2 is a schematic diagram of the electrical control circuit used with the invention;

FIGURE 3 is a view similar to FIGURE 1 but showing another embodiment of the invention;

FIGURE 4 is a fragmentary perspective view showing the connection between the motor and the operating shaft in the embodiment of FIGURE 3.

Referring to FIGURE 1, the invention is shown as embodied in an electric power driven circuit breaker comprising a basic molded case electric circuit breaker 10 having a generally rectangular insulating casing containing separable contacts and operating mechanism for operating such contacts, not shown, operated by a manually engageable handle of insulating material 11 projecting from the top wall of the insulating casing. The handle 11 is movable between "on" and "off" positions as indicated, and at each of such positions it encounters a positive stop or limit, such for example as the surfaces 12 and 13 of the insulating casing.

It will be understood that the circuit breaker 10 may, if desired, include mechanism which automatically opens the contacts upon the occurrence of predetermined current conditions through the circuit breaker, and if so, the manual operating handle may be provided with a third or intermediate position indicating the automatically opened or "tripped" condition of the mechanism.

For the purpose of permitting electric power operation of the operating handle 11, operating mechanism is provided including a main supporting plate 15 mounted on and spaced away from the top wall of the insulating casing of the circuit breaker 10 by suitable means such as by the bushings 16 and screws 17.

Motor supporting means is provided, comprising a generally U-shaped member of flat sheet metal material, having its bottom wall attached to the supporting plate 15 by suitable means such as by screws 19 and having a pair of bearings 20 and 21 in the opposed upstanding portions thereof. An electric motor 22 is slidably supported on the support 18 by having generally cylindrical projecting hub portions 23 and 24 journalled in the bearings 20 and 21 the motor 22. The motor 22 is prevented from rotating with respect to the support 18 by means of a pin 25 rigidly attached to the support 18 and extending into a slot 26 in the motor housing.

The motor has connected to its output shaft an elongated operating shaft 28, rigidly attached thereto for rotation with the motor armature. The outer end of the shaft 28 is reduced at 29 and carries a bearing 30, to which it is rigidly attached by suitable means, such as by the nut 31, which clamps the central or rotating portion of the bearing 30 to the shaft 28. The bearing 30 is slidably supported in a housing 32 comprising a portion of the rigid support 33 fixedly attached to the plate 15 by suitable means such as by screws 34. The bearing 30 is maintained in a generally central position in the housing 32 by resilient spring means 35 on one side thereof and 36 on the other side. Each of the springs 35 and 36 preferably comprises a series of conical spring washers of conventional type. The spring washers are retained in the housing 32 in one direction by the flange 37, and in the other direction by means of the snap-ring 38, which is snapped into a groove 39 cut in the inner surface of the housing 32.

It will therefore be apparent, from the structure thus far described, that the motor 22, the operating shaft 28, and the bearing 30 may all be displaced axially a small amount, but are retained in a given normal position as illustrated by the resilient means 35 and 36.

For the purpose of operating the handle 11, a travelling nut assembly 39 is provided which is preferably of the recirculating ball bearing or "Saginaw drive" type. The travelling nut 39 includes a pair of outwardly directed pins 40 (only one shown), which extend into arcuate slots 41 in the opposed side wall portions 42. The wall portions 42 are bridged at the bottom thereof by an inverted, generally U-shaped, transversely extending portion 43, which fits over the outer end of the handle 11.

The support 18 carries a pair of mounting posts 44, serving to support one end of a sheet-like member of resilient metallic material 45, having an aperture, not shown, through which the shaft 28 projects, and having its lower end return-bent for the purpose of actuating a miniature auxiliary switch 46.

In operation, assuming the motor 22 to be energized, the shaft 28 rotates at relatively high speed, causing the travelling nut 39 to move along its length, exerting a force through the pins 40 on the handle extension 42 and thence on the operating handle 11.

The springs 35 and 36 are selected to be of sufficient stiffness to prevent the reactive force existing on the shaft 28 at this time from actually moving the shaft any substantial amount. In other words, the force required to move the operating handle 11 is substantially less than the force required to shift the operating shaft 28 and it associates motor 22 longitudinally against the force of the springs 35, 36.

At the instant the handle 11 reaches its full extreme of travel in the right hand direction, encountering the stop 13, the motor 22 is still energized, and the shaft 28 is still rotating. Because of this, the shaft 28 threads itself back out of the travelling nut 39, in the opposite direction, that is to the left as viewed. Since the member 45 has a portion which extends into the slot 28a of the shaft 28, such movement deflects the member 45, actuating the switch 46. The switch 46 deenergizes the motor 22, and conditions the devices for operation in the opposite direction.

Any suitable control circuit may be utilized. In FIGURE 2, I have shown, by way of example, one possible control circuit, in which MW-1 and MW-2 represent windings of the motor 22, arranged when energized to drive the motor 22 in opposite directions respectively. Referring to the schematic circuit of FIGURE 2, and assuming that the circuit breaker and the control circuit are in the "off" condition and conditioned for "on" operation as shown, the operating sequence is as follows: (1) The "on" push-button is depressed, energizing relay 1. Relay 1 closes contacts A1 and B1, contact A1 bypassing the "on" push-button and locking-in relay 1, and contact B1 energizing the motor winding MW-1 (since the double-pole-double-throw switch 46 is in the proper position). The motor runs, turning the shaft 28 and moving the circuit breaker handle 11 to the "on" position as previously described. Upon the circuit breaker handle striking the surface 13 which limits its "on" movement, the shaft 28 and the motor 22 move longitudinally to the left as previously described, throwing the switch 46 to its opposite condition. This deenergizes the motor winding MW-1, deenergizes relay 1 and extinguishes the "off" indicating light 48. When the switch 46 moves to the condition shown in the dotted lines in FIGURE 2, it also lights the "on" indicating light, and conditions the circuit for "off" operation by means of the "off" push-button. (It will be noted that during the stable conditions, when the circuit breaker is either "on" or "off," both the relays 1 and 2 are deenergized.)

In FIGURE 3 there is shown a modification of the invention in which a motor 50 is provided which is rigidly mounted on the supporting plate 15 by suitable means such as by bolts 51. The motor 50 is provided with an output shaft 52 (see FIGURE 4) which has a hollow, splined, internal bore. The end of the operating shaft 53 is likewise provided with a corresponding splined end portion 54 adapted for sliding, non-rotatable fit in the output shaft 52.

The operation of the form of the invention shown in FIGURES 3 and 4 is generally similar to that described in connection with the form of FIGURE 1, excepting that when the handle of the circuit breaker 11 reaches the extreme of its permitted travel, continued rotation of the shaft 52 by the motor 53 causes it to thread through the travelling nut 39 and to move axially with respect to the motor 50. This is permitted by the end 54 sliding in the splined base of the shaft 52. Thus the shaft 52 is the only part that shifts longitudinally. The electrical circuitry and the operation of the switch 46 are similar to that described in connection with the previous form. Also, the springs 35 and 36 function as they do in the previous form to absorb inertia of the parts.

While only two forms of the invention have been shown, it will be readily apparent that many modifications thereof may be made, and we therefore intend by the appended claims to cover all such modifications as fall within the true spirit and scope of the invention.

What we claim as new and desire to secure by Letters Patent of the United States is:

1. A motor operated electric circuit breaker comprising:
   (a) a casing of insulating material;
   (b) an operating handle projecting from said casing;
   (c) an electric motor;
   (d) an elongated threaded operating shaft connected to said motor for rotation thereby;
   (e) means supporting said electric motor and said operating shaft on said casing for reciprocating longitudinal movement as a unit in a direction parallel to the axis of said shaft;
   (f) means biasing said motor and said shaft to a normal position while permitting resilient longitudinal movement of said motor and said shaft in each direction away from said normal position;
   (g) a travelling nut carried by said operating shaft and operatively connected to said circuit breaker operating handle;
(h) said handle being reciprocably movable between limiting stops;
(i) said operating shaft and said motor moving longitudinally with respect to said casing after said handle has encountered one of said limiting stops;
(j) limit switch means mounted on said casing, and
(k) operating means connected between said motor and said limit switch and operated in response to said longitudinal movement of said shaft and said motor for operating said limit switch.

2. A motor operated electric circuit breaker comprising:
(a) a casing of insulating material;
(b) an operating handle projecting from said casing and movable along an arcuate path between "on" and "off" positions;
(c) an electric motor and means supporting said electric motor on said insulating casing;
(d) an operating shaft and means rotatably supporting said operating shaft on said insulating casing in a direction generally parallel to said path of movement of said operating handle;
(e) means connecting said operating shaft to said electric motor for operation thereby;
(f) said means supporting said electric motor and said operating shaft on said casing providing for reciprocating longitudinal movement of said motor and said operating shaft with respect to said casing as a unit in a direction parallel to the axis of said shaft;
(g) means resiliently maintaining said motor and said operating shaft in a normal longitudinal position;
(h) a travelling nut carried by said operating shaft;
(i) connecting means connecting said operating handle to said travelling nut comprising a pair of spaced apart wall portions and a portion extending between said spaced apart wall portions receiving a portion of said operating handle;
(j) said spaced apart wall portions each having an arcuate slot therein, said travelling nut having a pair of outwardly directed pins each extending into one of said arcuate slots, the line of action exerted by said travelling nut on said connecting means being in a direction substantially parallel to said axis of said operating shaft in all positions of said operating handle;
(k) means limiting movement of said operating handle, said operating shaft and said motor moving longitudinally with respect to said casing after said handle has encountered said limiting means;
(l) limit switch means carried by said casing;
(m) switch operating means connected between said motor and said limit switch and operating said limit switch in response to longitudinal movement of said motor with respect to said casing.

References Cited by the Examiner
UNITED STATES PATENTS

| | | | |
|---|---|---|---|
| 2,253,170 | 8/41 | Dunham | 318—475 |
| 2,407,537 | 5/44 | Chapman | 318—469 X |
| 2,688,718 | 10/50 | Hoffar | 318—468 X |
| 2,864,912 | 12/58 | Schmidt | 200—92 |
| 2,870,288 | 1/59 | Schmidt | 200—92 |
| 3,084,318 | 4/63 | Lind | 318—469 |

ORIS L. RADER, *Primary Examiner.*

MILTON O. HIRSHFIELD, *Examiner.*